(12) United States Patent
Sato

(10) Patent No.: US 12,003,676 B2
(45) Date of Patent: Jun. 4, 2024

(54) NON-TRANSITORY COMPUTER-READABLE RECORDING MEDIUM, TERMINAL DEVICE, AND DISPLAY CONTROL METHOD

(71) Applicant: BROTHER KOGYO KABUSHIKI KAISHA, Nagoya (JP)

(72) Inventor: Hirokazu Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/507,718

(22) Filed: Oct. 21, 2021

(65) Prior Publication Data

US 2022/0131984 A1 Apr. 28, 2022

(30) Foreign Application Priority Data

Oct. 28, 2020 (JP) ................................. 2020-180185

(51) Int. Cl.
*G06F 15/00* (2006.01)
*H04L 67/55* (2022.01)
*H04N 1/00* (2006.01)

(52) U.S. Cl.
CPC ......... *H04N 1/00228* (2013.01); *H04L 67/55* (2022.05); *H04N 1/00214* (2013.01); *H04N 1/00225* (2013.01); *H04N 1/00477* (2013.01)

(58) Field of Classification Search
CPC ........... H04N 1/00228; H04N 1/00214; H04N 1/00225; H04N 1/00477; H04L 67/55
USPC ...................................................... 358/1.15
See application file for complete search history.

(56) References Cited

U.S. PATENT DOCUMENTS

| 2005/0052684 A1* | 3/2005 | Ferlitsch | H04N 1/00408 358/1.15 |
| 2008/0046467 A1* | 2/2008 | Nakajima | G06F 12/1458 |
| 2012/0019873 A1* | 1/2012 | Tian | H04N 1/33346 358/442 |
| 2012/0026556 A1* | 2/2012 | Katahira | H04N 1/00222 358/442 |
| 2014/0009778 A1* | 1/2014 | Hanano | H04N 1/00962 358/1.13 |

(Continued)

FOREIGN PATENT DOCUMENTS

| JP | 2017-076244 A | 4/2017 |
| JP | 2018-195100 A | 12/2018 |

*Primary Examiner* — Mark R Milia
(74) *Attorney, Agent, or Firm* — KENEALY VAIDYA LLP

(57) ABSTRACT

A non-transitory computer-readable recording medium storing a program including computer-readable instructions for a terminal device. The terminal includes a communication interface and a user interface. The computer-readable instructions, when executed by a controller of the terminal device, cause the terminal device to: acquire scan data generated by a push scan process of a scanner from a server via the communication interface, the push scan process being a process of causing the scanner to generate the scan data and uploading the generated scan data to the server; acquire, via the communication interface, job information in the push scan process, an address corresponding to the terminal device being specified as a destination of the scan data; and display an execution state of the push scan process on the user interface based on the job information.

22 Claims, 11 Drawing Sheets

(56) References Cited

U.S. PATENT DOCUMENTS

2015/0153977 A1\* 6/2015 Tanaka .................. G06F 1/3284
358/1.14
2015/0355874 A1\* 12/2015 Kamoi .................... G06F 3/126
358/1.15
2018/0338054 A1 11/2018 Fujiwara \* cited by examiner નon-TRANSITORY COMPUTER-READABLE RECORDING MEDIUM, TERMINAL DEVICE, AND DISPLAY CONTROL METHOD

CROSS-REFERENCE TO RELATED APPLICATIONS

This application claims priority from Japanese Patent Application No. 2020-180185 filed on Oct. 28, 2020, the entire contents of which are incorporated herein by reference.

TECHNICAL FIELD

Aspects of the present disclosure relate to a technology for generating scan data by reading a document.

BACKGROUND

There is a related-art device capable of executing a so-called push scan process of uploading scan data generated by a scanner to a server. As a result, for example, even when a user is located at a place away from the device, by operating a terminal device to access the server, the scan data stored in the server can be downloaded to the terminal device.

SUMMARY

It is sometimes difficult for a user who operates the terminal device to know a current state of the scan data generated by the push scan process. For example, when there is a large amount of uploaded scan data, there is a concern that it may be difficult for the user who operates the terminal device to know a state of each piece of scan data.

Aspects of the present disclosure improve convenience of a user who operates a terminal device capable of causing a scanner to execute a push scan process.

An aspect of the present disclosure is a non-transitory computer-readable recording medium storing a program including computer-readable instructions for a terminal device. The terminal device includes a communication interface and a user interface. The computer-readable instructions, when executed by a controller of the terminal device, cause the terminal device to acquire scan data generated by a push scan process of a scanner from a server via the communication interface. The push scan process is a process of causing the scanner to generate scan data and uploading the generated the scan data to the server. The computer-readable instructions, when executed by the controller, cause the terminal device to acquire, via the communication interface, job information related to the push scan process. An address corresponding to the terminal device is specified as a destination of the scan data on the push scan process. The computer-readable instructions, when executed by the controller, cause the terminal device to display an execution state of the push scan process on the user interface based on the job information.

In the above configuration, the terminal device acquires the scan data generated by the push scan process from the server via the communication interface. The terminal device acquires, via the communication interface, the job information in the push scan process, the address corresponding to the terminal device being specified as a destination of the scan data, and displays the execution state of the push scan process on the user interface based on the acquired job information. As a result, the user can know the execution state of the push scan process by viewing the terminal device, so that the convenience for the user can be improved.

The present disclosure can be implemented in various forms, and can be implemented as a terminal device and a display control method executed by the terminal device in addition to the non-transitory computer-readable recording medium storing a program including computer-readable instructions for the terminal device.

According to the non-transitory computer-readable recording medium as described above, the convenience of a user when a push scan process is executed can be improved.

DETAILED DESCRIPTION

First Embodiment

A scanning system according to the present embodiment will be described with reference to the drawings.

Figure 1:
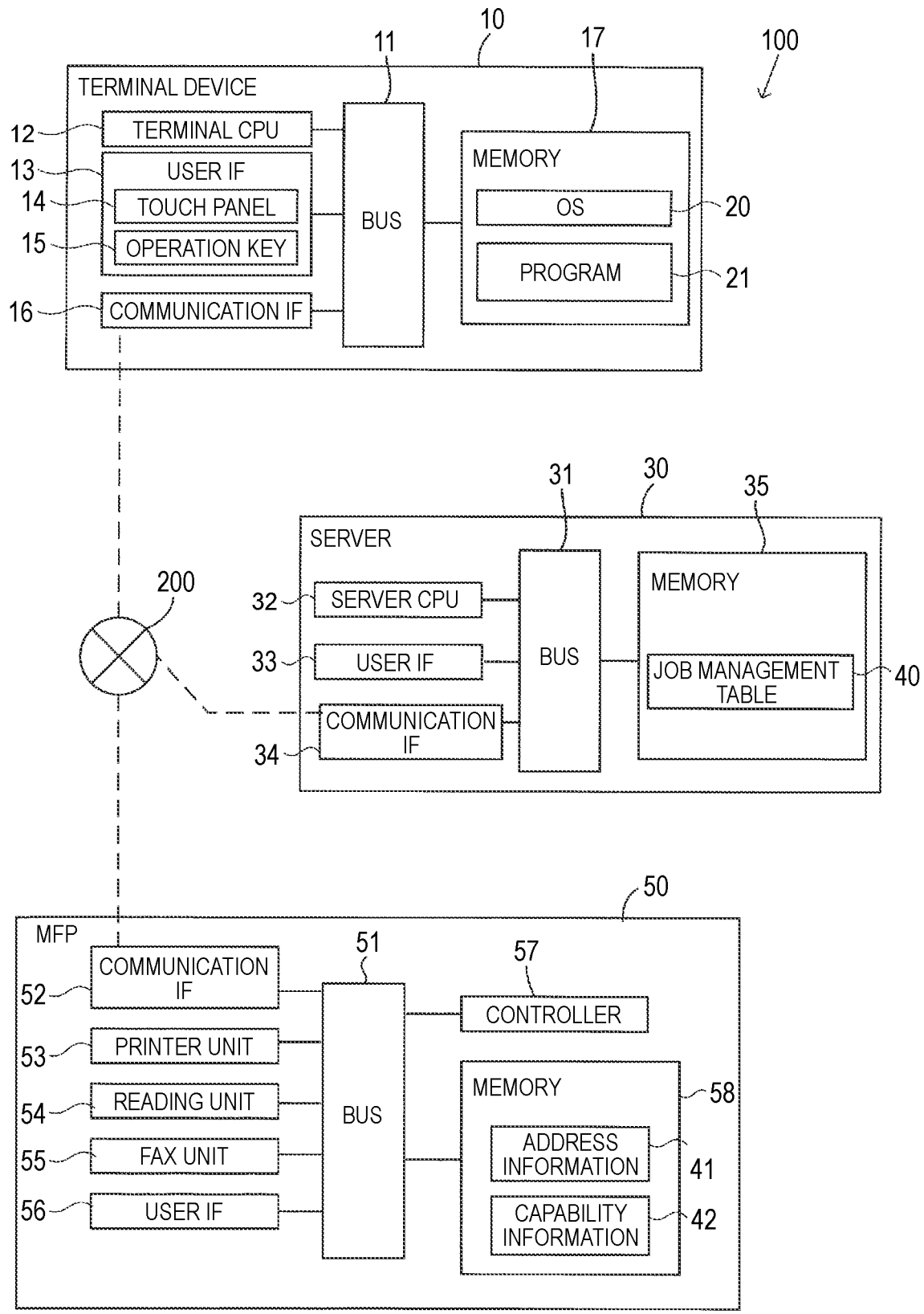
FIG. 1 is a configuration diagram of a scanning system.

A scanning system 100 illustrated in FIG. 1 includes a terminal device 10, a server 30, and an MFP (Multifunction Peripheral/Printer/Product) 50. The terminal device 10, the server 30, and the MFP 50 are connected to network 200. In the present embodiment, the network 200 may be the Internet, a local area network (LAN), or a combination of the LAN and the Internet. The network 200 may be wired network, wireless network, or a combination of the wired network and the wireless network. In the present embodiment, it is assumed that the terminal device 10 and the MFP 50 are wirelessly connected to a router (not illustrated) constituting a part of the network, and the terminal device 10 or the MFP 50 and the server 30 are connected to each other via the Internet. In the present embodiment, the MFP 50 is an example of a scanner.

The hardware configuration of the MFP 50 will be described. The MFP 50 includes a bus 51, a communication IF 52, a printer unit 53, a reading unit 54, a FAX unit 55, a user IF 56, a controller 57, and a memory 58. The elements of the MFP 50 are connected to each other via the bus 51 to be able to communicate with each other. IF is an abbreviation of Interface.

The communication IF 52 connects the MFP 50 to the network 200 in accordance with a predetermined communication protocol. The user IF 56 is an interface interposed between the controller 57 of the MFP and a user, and includes a touch panel and an operation key in the present embodiment. The controller 57 controls operations of the printer unit 53, the reading unit 54, the FAX unit 55, and the user IF 56.

The printer unit 53 executes a printing operation of printing an image on a recording medium such as a sheet or a disk. As a recording method of the printer unit 53, an inkjet method in which ink as a medium for recording is ejected onto a recording medium, an electro photographic method in which a toner image is formed on a photoreceptor and the formed toner image is transferred onto a recording medium, or the like can be adopted. The reading unit 54 executes a scanning operation of reading an image recorded on a document and generating scan data. The controller 57 of the MFP 50 can cause the reading unit 54 to read a document set on an auto document feeder (ADF) or a reading table to create scan data, and transmit the generated scan data to the server 30 or the terminal device 10 via the communication IF 52. The FAX unit 55 transmits and receives image data by a method based on a FAX protocol. In addition, the MFP 50 may be capable of executing a composite operation in which a plurality of operations are combined. A copy operation in which the printing operation by the printer unit 53 and the scanning operation by the reading unit 54 are combined is an example of a composite operation.

In the present embodiment, a push scan process and a pull scan process can be executed as the scanning operation to be executed by the MFP 50. The push scan process is a process of causing the MFP 50 to create scan data and to upload the generated scan data to the server 30 when the MFP 50 receives an instruction to execute a scanning operation from the user via the user IF 56. The scan data uploaded to the server 30 can be downloaded by operating the terminal device 10. The pull scan process is a process in which the terminal device 10 transmits an instruction to execute a scanning operation to the MFP 50 when the terminal device 10 receives the instruction to execute the scanning operation from the user via the user IF 13 of the terminal device 10. In response to reception of the instruction, the MFP 50 creates scan data, and transmits the generated scan data to the terminal device 10.

The controller 57 is implemented by a CPU, an application specific integrated circuit (ASIC), and the like, and controls each element of the MFP 50. The memory 58 stores various programs to be executed by the controller 57.

In the present embodiment, the memory 58 is formed by combining, for example, a random access memory (RAM), a read only memory (ROM), and a flash memory. The memory 58 may be a recording medium readable by the controller 57, which is a computer. The recording medium also includes a recording medium such as a CD-ROM or a DVD-ROM. Hereinafter, the same applies to memories 17 and 35 to be described later.

The memory 58 stores address information 41 and capability information 42 as data to be referred to by the controller 57. The address information 41 is information for identifying a device which is a target address of the scan data generated by the push scan process. The target address of the scan data is specified as a destination of the scan data. The address information 41 includes, for example, items of "display name" and "program ID". The "display name" is information indicating a name when the device which is the target address is displayed on the user IF 56. The "program ID" is an ID for identifying a program stored in the device which is the target address. For example, in the terminal device 10, the program ID is an ID for identifying the program 21.

The capability information 42 includes a plurality of items indicating the performance of the MFP 50, and is, for example, information on a structure format. In the capability information 42, items including "document size", "resolution", "color setting", "reading format", "file format", and "ADF inclination correction" are stored as items related to the scanning operation. The "document size" is information indicating a reading range of a document when the MFP 50 executes the scanning operation. For example, "A4" is information indicating that a document is read in an A4-size reading range, and "automatic" is information indicating that the reading range can be automatically adjusted in accordance with the document. The "resolution" is information indicating the resolution of scan data when the scanning operation is executed. The "color setting" is information for setting the presence or absence of a color of the scan data when the MFP 50 executes the scanning operation, and includes, for example, "color" and "monochrome". The "reading format" is information indicating a reading surface (both sides, one side) of the document when the MFP 50 executes the scanning operation. The "file format" is information indicating a file format (JPEG, TIFE) of the scan data when the MFP 50 executes the scanning operation. The "ADF inclination correction" is information indicating whether to correct the inclination with respect to the read image when reading the document set in the ADF. The capability information 42 may include items of "brightness", "contrast", and "blank sheet removal".

Next, the hardware configuration of the server 30 will be described. The server 30 includes a bus 31, a server CPU 32, a user IF 33, a communication IF 34, and a memory 35. The elements constituting the server 30 are connected to each other via the bus 31 to be able to communicate with each other.

Figure 2:
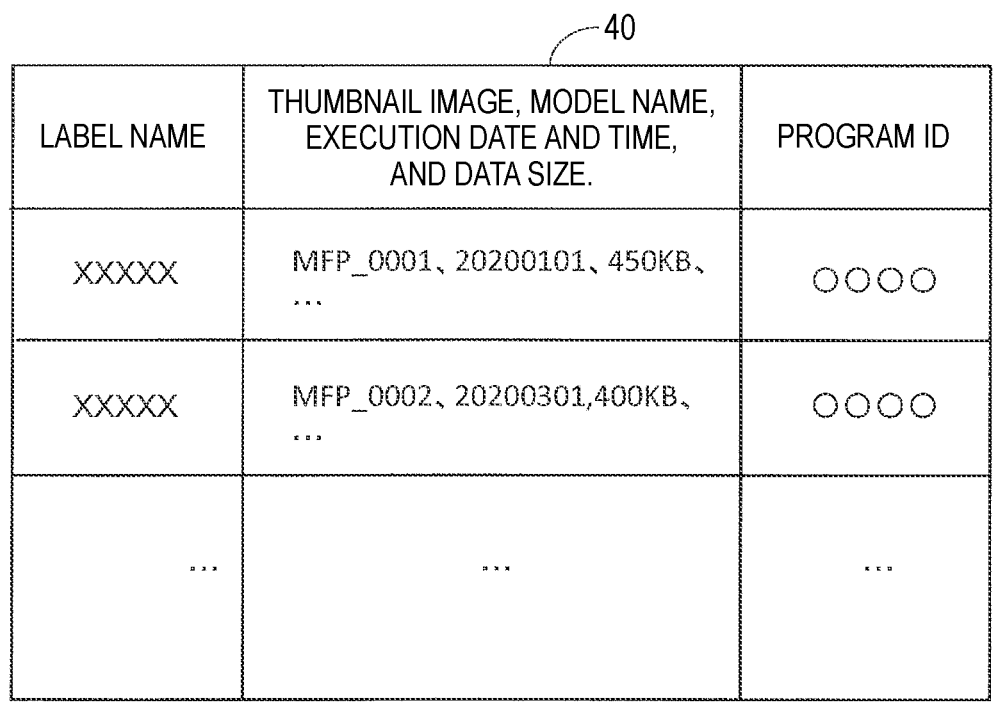
FIG. 2 is a diagram illustrating a job management table.

A job management table 40 illustrated in FIG. 2 is stored in a data storage area of the memory 35. The job management table 40 is information related to the scan data uploaded to the server 30 by the execution of the push scan process. The job management table 40 will be described later.

Next, the terminal device 10 will be described. The terminal device 10 is a smartphone or a tablet device. The terminal device 10 includes a bus 11, a terminal CPU 12, a user IF 13, a communication IF 16, and a memory 17. These elements can communicate with each other via the bus 11.

The user IF 13 includes a touch panel 14 and an operation key 15. The touch panel 14 includes a touch sensor, and outputs a signal corresponding to a detection result by the touch sensor. Note that "touch" in the present embodiment includes all operations for bringing an input medium into contact with the display screen of the touch panel 14. Specifically, a tap operation of separating the touched input medium from the touch panel 14 within a predetermined time will be described as an example of the touch, but the touch may be a long touch operation, a slide operation, a flick operation, a pinch-in operation, a pinch-out operation, and the like. The concept of "touch" described above may include bringing the input medium close to the touch panel 14 to a position where a distance between the input medium and the touch panel 14 is very small. Further, the input medium may be a finger of the user, a touch pen, and the like.

The communication IF 16 can perform wireless communication of the Wi-Fi scheme based on, for example, the IEEE 802.11 standard and a standard equivalent thereto. Wi-Fi is a registered trademark of the Wi-Fi Alliance. The communication IF 16 may perform short-range wireless communication such as Bluetooth with the MFP 50, or may perform wireless communication using a mobile communication system via a base station. Bluetooth is a registered trademark of Bluetooth Special Interest Group (SIG).

The terminal CPU 12 controls each element of the terminal device 10 by executing a program stored in the memory 17. In the present embodiment, the terminal CPU 12 is an example of a controller.

The memory 17 stores an operating system (OS) 20 and a program 21. Hereinafter, a CPU that executes a program may be simply referred to as a program name. For example, the description "program 21" may refer to "terminal CPU 12 that executes the program 21".

In the present embodiment, processes of the CPU according to instructions described in the program will be mainly described. That is, processes such as "determine", "extract", "select", "calculate", "decide", "specify", "acquire", "receive", and "control" in the following description represent processes of the CPU or the controller. The process executed by the CPU also includes hardware control via the OS 20. "Acquire" is used as a concept that does not require a request. That is, a process of receiving data without being requested by the program 21 is also included in the concept of "CPU acquires data". In addition, "data" in the present specification is expressed in a computer-readable format. It is assumed that data having substantially the same meaning and different formats are treated as the same data. The same applies to "information" in the present specification.

The OS 20 includes an application programming interface (API) that enables the program 21 to use functions of the OS 20, to communicate with the server 30 and the MFP 50, and to use functions of other programs. The program 21 causes the MFP 50 connectable via the communication IF 16 to execute the printing operation, a scanning operation, a FAX operation, and the like by the function of the OS 20. When the push scan process is executed by the MFP 50, the program 21 can execute a process for downloading the scan data uploaded to the server 30.

Figure 3:
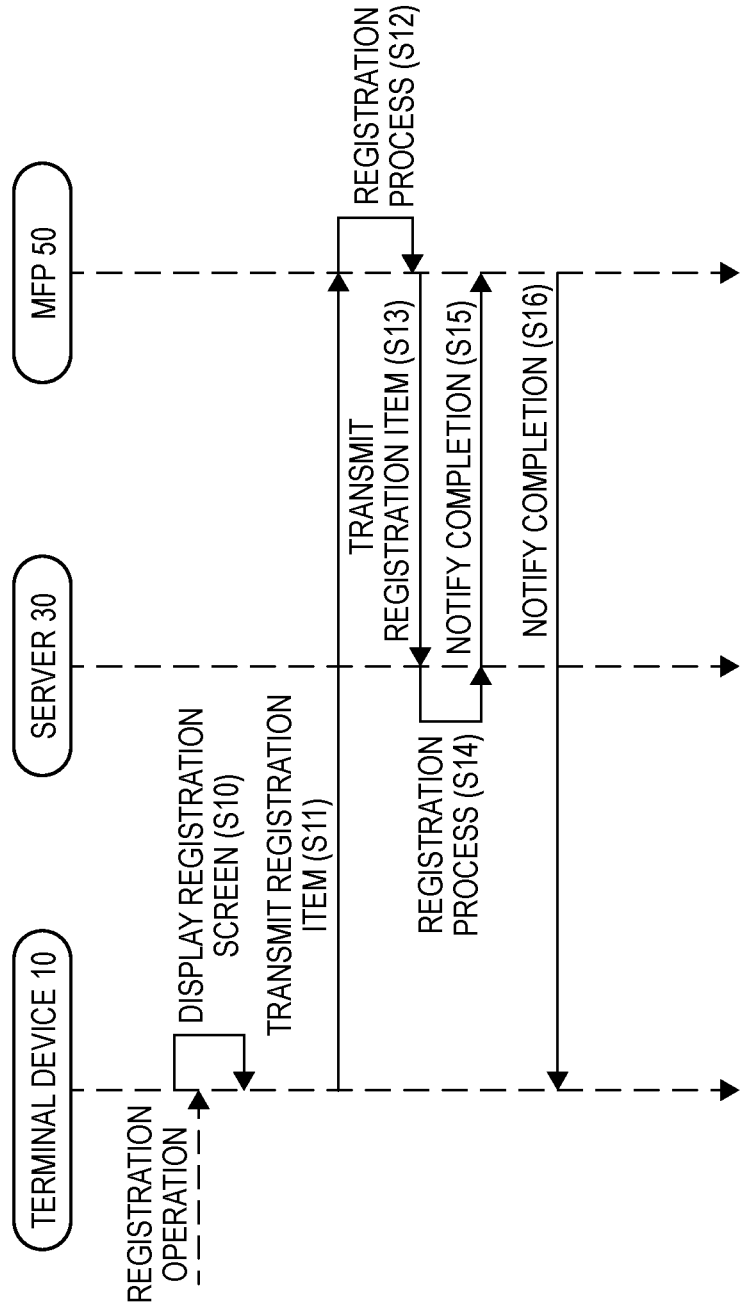
FIG. 3 is a timing chart illustrating a registration process.

Next, a registration process executed among the terminal device 10, the server 30, and the MFP 50 will be described with reference to FIG. 3. The registration process is a process of causing the server 30 and the MFP 50 to register a target address of the scan data generated by the push scan process. Among the processes illustrated in FIG. 3, the process to be executed by the terminal device 10 is executed by the program 21. The process executed between the terminal device 10 and the MFP 50 is performed by local communication such as Wi-Fi or short-range wireless communication.

In step S10 (hereinafter, simply referred to as S10), the terminal CPU 12 (program 21) displays a registration screen on the user IF 13, and receives an input operation of registration information by the user via the user IF 13. The registration screen is a screen for registering the terminal device 10 in the address information 41 of the MFP 50 in response to the operation by the user. For example, selection of a device to be a registration address and input of a "display name" registered in the address information 41 are received on the registration screen. The "program ID" is automatically set by the program 21.

In S11, the program 21 transmits the items set in S10 together with a registration request to the MFP 50 selected as the registration address. In S12, the controller 57 of the MFP 50 executes a registration process of storing the items transmitted from the terminal device 10 in the address information 41. Therefore, in the MFP 50, the terminal device 10 is registered as a target address. In S13, the controller 57 transmits the item registered in S12 and identification information of the MFP 50 to the server 30 together with the registration request.

In S14, the server CPU 32 stores the items transmitted from the MFP 50 in the memory 35, so as to store the address information 41 related to the terminal device 10. Accordingly, the server 30 can determine that the terminal device 10 has been registered as the target address of the MFP 50. In S15, the server CPU 32 notifies that the registration with respect to the MFP 50 has been completed. In S16, the controller 57 of the MFP 50 notifies the terminal device 10 that the registration has been completed.

Figure 4:
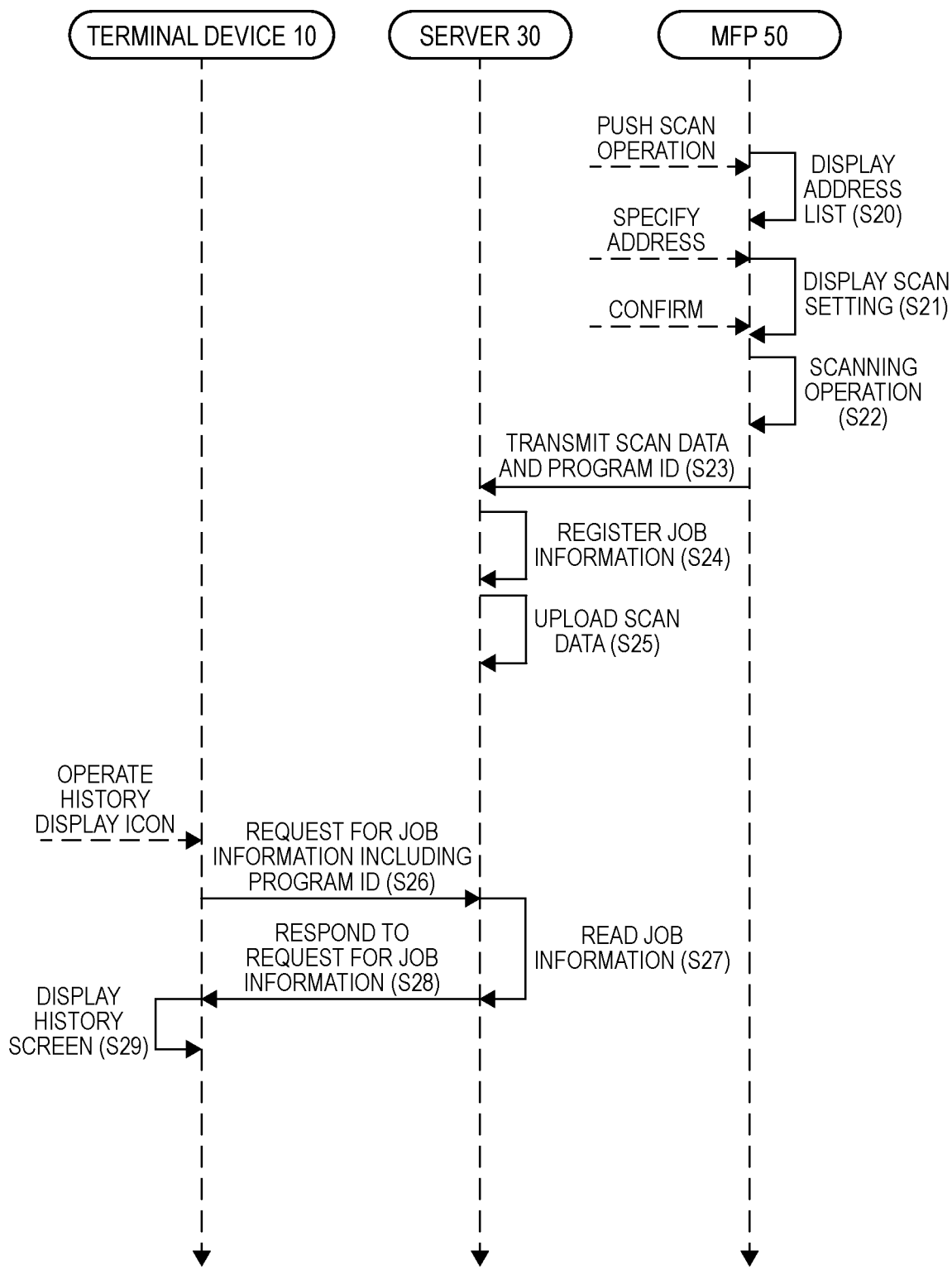
FIG. 4 is a timing chart illustrating a display procedure of a history screen.

Next, a process executed among the terminal device 10, the server 30, and the MFP 50 when executing the push scan process will be described with reference to FIG. 4. The process illustrated in FIG. 4 is started when an operation to instruct execution of the push scan process is executed on an operation screen displayed on the user IF 56 of the MFP 50. In addition, it is assumed that the terminal device 10 is registered as a target address for the push scan process by the process illustrated in FIG. 3 prior to the process illustrated in FIG. 4.

In S20, the controller 57 of the MFP 50 causes the user IF 56 to display an address list. In the address list displayed on the user IF 56, the display names of the target addresses stored in the address information 41 are displayed in a list.

When the user operates the user IF 56 to designate a display name corresponding to the terminal device 10 among the display names displayed in the address list, the controller 57 causes the user IF 56 to display the scan setting of the MFP 50 in S21. In the present embodiment, the scan setting displayed in S21 is a scan setting set in advance as a scan setting in the push scan process. For example, setting values of "document size", "resolution", "color setting", "reading format", "file format", and "ADF inclination correction" are displayed. The displayed setting values can be changed by a user operation within a range for the setting values included in the capability information 42. Alternatively, the program ID associated with the display name designated as the address may be read out, and the scan setting associated with the program ID may be displayed on the user IF 56.

When the user operates an icon for confirming the execution of the push scan process, the controller 57 creates scan data by causing the reading unit 54 to read the document set on the document table in S22, for example. When the user performs a touch operation on an icon for canceling the execution of the scanning operation, the controller 57 does not execute the scanning operation.

In S23, the controller 57 transmits the scan data generated in S22 to the server 30 by designating the terminal device designated by the user (in the present embodiment, the terminal device 10) as the address. Specifically, the controller 57 transmits the program ID associated with the display name designated on the address information 41 to the server 30 together with the scan data generated in S22.

In the present embodiment, the scan data includes, in addition to image data generated by reading a document, a thumbnail image, a label name, a model name, an execution date and time, and a data size. The label name is information for identifying the scan data, and is set by the controller 57 when the scan data is generated. The model name is the name of a device that has executed the push scan process, and is the model name of the MFP 50 in the present embodiment. The execution date and time is information indicating the date and time when the push scan process is executed.

When the server CPU 32 of the server 30 receives the scan data transmitted from the MFP 50, the server CPU 32 registers job information in the job management table 40 in S24. Specifically, the label name, the model name, the execution date and time, the data size, and the thumbnail image included in the scan data are stored as job information in the job management table 40 in association with the program ID transmitted in S23. As illustrated in FIG. 2, in the job management table 40, the thumbnail image, the model name, the execution date and time, the data size, and the program ID are stored in association with the label name.

Referring back to FIG. 4, in S25, the server CPU 32 uploads the scan data by storing the scan data transmitted from the MFP 50 in the memory 35. The uploaded scan data is stored in the memory 35 in association with the label name of the job management table 40. The server 30 may upload the scan data by storing the scan data in another server such as a management server.

Next, a procedure of a job information acquisition process of acquiring job information corresponding to the scan data uploaded to the server 30 by an operation of the terminal device 10 will be described. In the present embodiment, the program 21 displays, on the user IF 13, a history screen indicating an execution state of the scan process based on the acquired job information.

Figure 5:
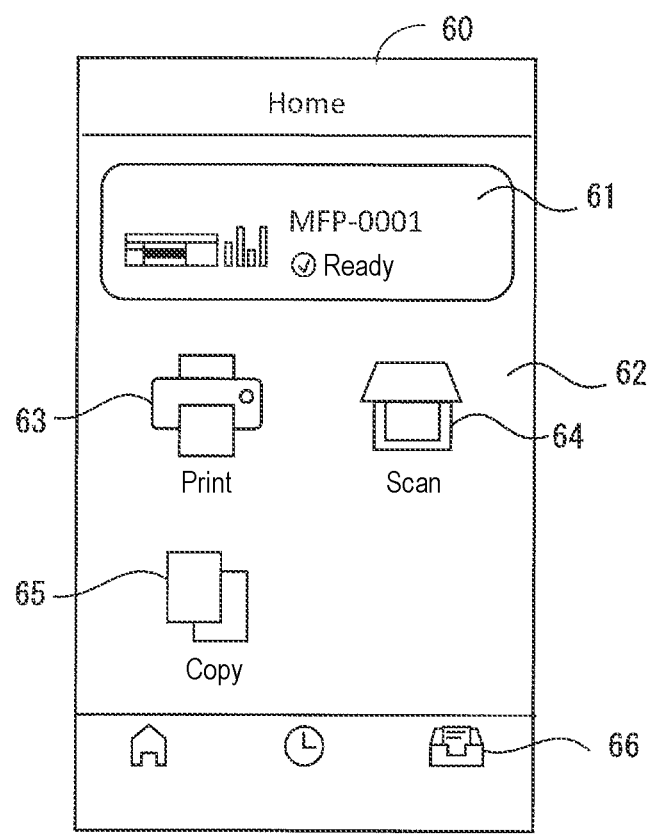
FIG. 5 is a diagram illustrating a function selection screen.

The program 21 causes the user IF 13 to display a function selection screen 60 illustrated in FIG. 5 by an operation of instructing activation received via the user IF 13. The function selection screen 60 includes a device designation region 61 and a function display region 62. The device designation region 61 is a region in which a device to be controlled is displayed. In the function selection screen 60 illustrated in FIG. 5, "MFP-0001" is displayed as the model name of the MFP 50 to be controlled. The program 21 can change the model name displayed in the device designation region 61 by an operation received via the user IF 13. The function display region 62 is a region in which an icon for receiving an instruction related to a function of the device designated on the device designation region 61 is displayed. In the function display region 62 illustrated in FIG. 5, an operation icon 63 that receives an instruction for executing the "printing operation", an operation icon 64 that receives an instruction for executing the "pull scan process", and an operation icon 65 that receives an instruction for executing the "copy operation" are displayed for the designated MFP 50. In the function display region 62, a history display icon 66 that receives a display instruction for the history screen in the scanning operation is displayed. The history screen will be described later.

Referring back to FIG. 4, when the program 21 receives an instruction operation for the history display icon 66 on the function selection screen 60 from the user IF 13, the program 21 transmits a request for job information related to scan data of which an address is the terminal device 10 to the server 30 in S26. The address corresponding to the terminal device 10 is specified as a destination of the scan data. Specifically, the program 21 transmits the program ID to the server 30 together with the request for the job information.

When the server CPU 32 receives the program ID together with the request for the job information, the server CPU 32 refers to the job management table 40 stored in the memory 35 and reads out the job information associated with the transmitted program ID in S27. When the push scan process is not executed, the scan data is not uploaded and the job information is not stored. In the present embodiment, the server 30 deletes the job information from the downloaded scan data. Therefore, when the push scan process is executed between a timing at which the history display icon is displayed last time and a current timing, the job information is read out since the job information is registered in the job management table 40 of the memory 35. On the other hand, when the push scan process is not executed between the time at which the history display icon is displayed last time and the current time, the job information is not read out since the job information is not registered in the job management table 40.

In S28, the server CPU 32 responds to the request for the job information in S26. When the job information is not read out in S27, a response is returned to the terminal device 10 without transmitting the job information of the scan data of which an address is the terminal device 10 in S28. The address corresponding to the terminal device 10 is specified as a destination of the scan data. On the other hand, when the job information is read out in S27, the job information of the scan data of which an address is the terminal device 10 is transmitted to the terminal device 10 in S28. In the present embodiment, the process executed by the terminal CPU 12 in S26 is an example of the job information acquisition process. In a case where the response of S28 is not received even after a certain period has elapsed with respect to the request of S26, instead of proceeding to S29, the terminal device 10 adds information indicating a connection error with the server to a display field in which "not downloaded" is stored in the history information to be described later, and displays the history screen 70 to be described later.

Figure 6:
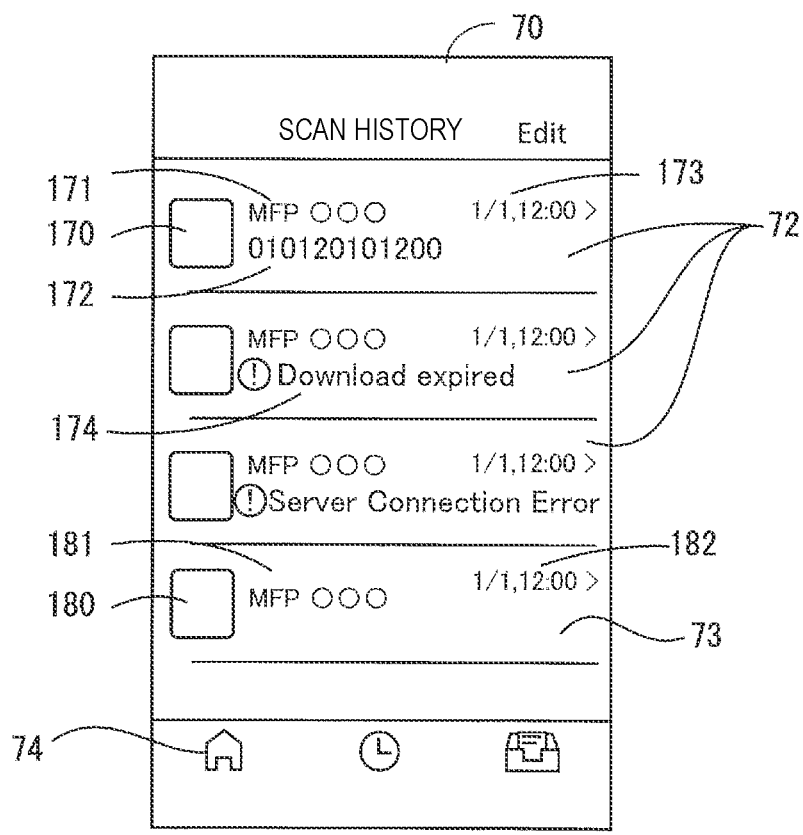
FIG. 6 is a diagram illustrating a history screen.

When the program 21 receives the response transmitted from the server 30, the program 21 executes a display process of displaying the history screen 70 illustrated in FIG. 6 in S29. The history screen 70 is a screen showing an execution state of the push scan process and the pull scan process. The history screen 70 has a display field for displaying information related to the scan data. In the present embodiment, the display field is rectangular regions arranged in the height direction. The history screen 70 includes a push scan display field 72 in which information related to the scan data generated by the push scan process is displayed, and a pull scan display field 73 in which information related to the scan data generated by the pull scan process is displayed.

In the push scan display field 72, a thumbnail image 170, a model name 171, a label name 172, an execution date and time 173, and status information 174 are displayed as history information. The thumbnail image 170, the model name 171, the label name 172, and the execution date and time 173 are job information related to the scan data. The status information 174 is information indicating the status of the push scan process, and in the present embodiment, includes information indicating the statuses of "not downloaded", "downloaded", and "download expired". In the present embodiment, in the top push scan display field 72, instead of displaying the status information 174 indicating "downloaded", the label name 172 of the downloaded scan data is displayed. As described above, the status information 174 may not be a character string directly indicating a download state of the scan data. In the second push scan display field 72 from the top, status information 174 indicating "download expired" is displayed. The "download expired" indicates that the scan data uploaded to the server 30 is automatically deleted from the server 30 when a predetermined storage period (for example, one week) has elapsed from the execution date and time of the push scan process without being downloaded. In this case, only the scan data is deleted, and only the job information is left. In the third push scan display field 72 from the top, "server connection error" is displayed. In addition to the job information and the status information, when the setting of "favorite registration" is received from the user via the user IF 13, the favorite registration may be displayed in the display fields 72 and 73.

In the pull scan display field 73, a thumbnail image 180, a model name 181, and an execution date and time 182 are displayed as history information. The pieces of information 180, 181, and 182 are the same as the pieces of information 170, 171, and 173 displayed in the push scan display field 72, respectively. The status information may be displayed in the pull scan display field 73. In this case, the status information displayed in the pull scan display field 73 may be, for example, "update date and time" when an additional pull scan is executed after a pull scan is already executed.

When an icon 74 is operated on the history screen 70, the program 21 causes the user IF 13 to display the function selection screen 60. That is, the screen transition is returned to the previous state.

Figure 7:
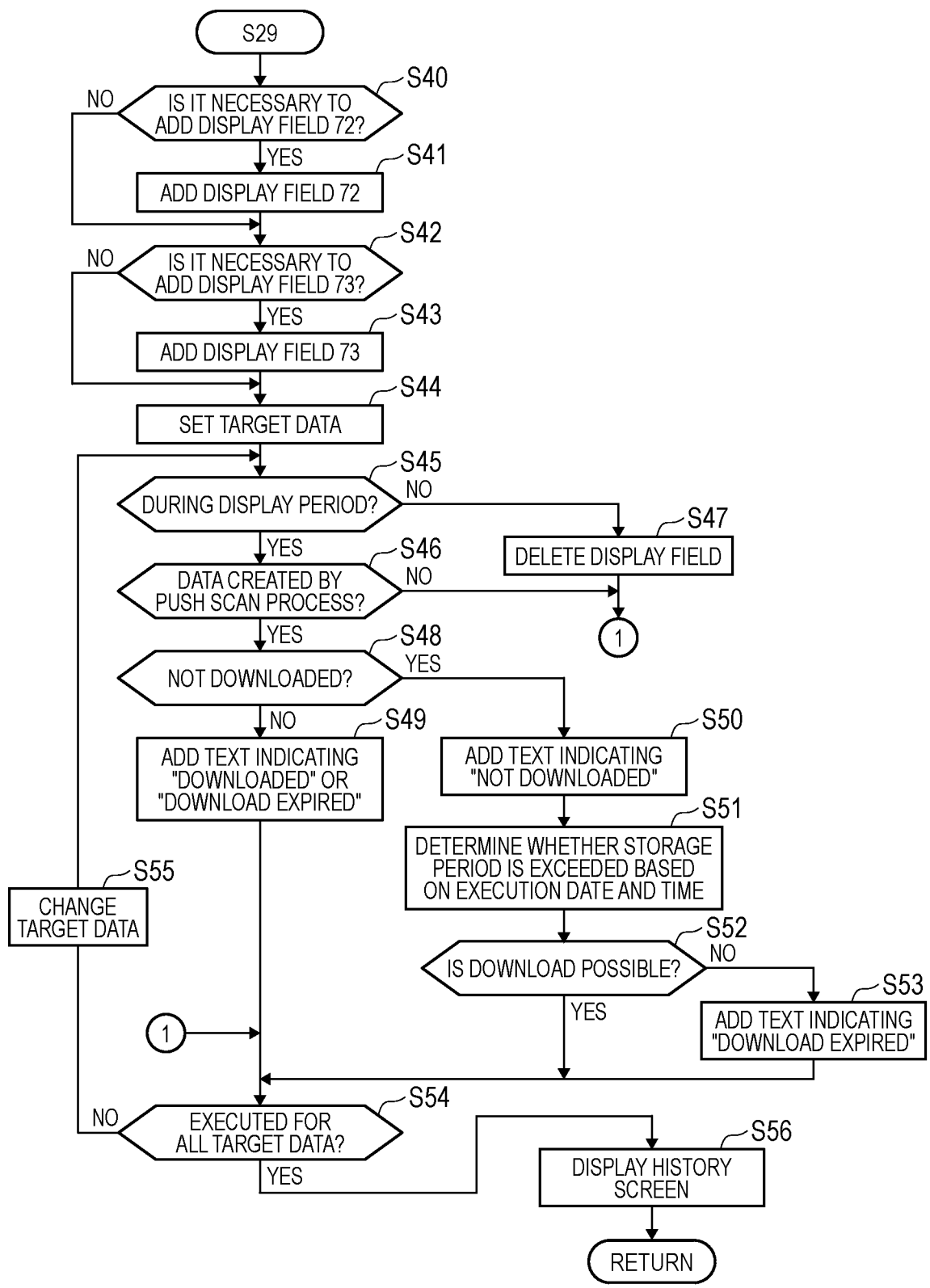
FIG. 7 is a flowchart illustrating the process in S29 of FIG. 4.

FIG. 7 is a flowchart illustrating the procedure of the display process executed by the program 21 in S29. In S40, it is determined whether it is necessary to add the push scan display field 72 to the history screen 70. When the job information is acquired in response to the request for the job information in S26 and the acquired job information is not job information that has already been acquired, an affirmative determination is made in S40, and the process proceeds to S41. This is because, when the scan data is stored without being downloaded from the server 30, the job information may be acquired a plurality of times for the same scan data at the timing of displaying the history screen 70. In S40, when the job information is not acquired in response to the request for the job information in S26, or when the acquired job information is the job information that has already been acquired, a negative determination is made in S40, and the process proceeds to S42.

In S41, the push scan display field 72 is created using the newly acquired job information. In the present embodiment, data corresponding to the push scan display field 72 is added to the history screen data for displaying the history screen 70. When S41 is completed, the process proceeds to S42.

In S42, it is determined whether it is necessary to add the pull scan display field 73 to the history screen 70. When the pull scan display field 73 is not created among the scan data generated by the pull scan process, an affirmative determination is made in S42, and the process proceeds to S43. In S43, the pull scan display field 73 is created using the job information stored in the memory 17. When the process of S43 ends or when a negative determination is made in S42, the process proceeds to S44.

In S44, among the scan data for which the display fields 72 and 73 have been created, target data for which the status information is to be updated is set. In the present embodiment, the status information is updated for all the scan data in which the push scan display field 72 and the pull scan display field 73 are displayed.

When the scan data generated by the push scan process and the job information are downloaded from the server 30 and when the scan data is generated by the pull scan process, the program 21 stores the data in respective dedicated folders and creates history information. The history information includes the job information acquired from the server, the status information, setting of "favorite registration", creation date and time of a display field, and the like. The program 21 can determine Whether each piece of scan data is downloaded by referring to the history information.

The server CPU 32 of the server 30 deletes the job information of the downloaded scan data from the job management table 40.

In S45, it is determined whether the display fields 72 and 73 are in a display period. In the present embodiment, in a case where a predetermined display period has elapsed from the creation date and time of the display fields 72 and 73 included in the history information, a negative determination is made in S45, and the process proceeds to S47. When the target data is the scan data generated by the pull scan process, a date and time at which the display period is determined may be an update date and time, which is a date and time at which an additional scan described later is performed, in addition to the execution date and time. On the other hand, when an affirmative determination is made in S45, the process proceeds to S46. Whether to automatically delete the display fields 72 and 73 by the terminal CPU 12 can be set by setting the function selection screen 60. In S47, the display field of the target data included in history image data is deleted. After the process of S47, the process proceeds to S54.

In S46, it is determined whether the target data is scan data generated by the push scan process. When a negative determination is made in S46, that is, when the target data is the scan data generated by the pull scan process, the process proceeds to S54. On the other hand, when an affirmative determination is made in S46, the process proceeds to S48.

In S48, it is determined whether the target data has been downloaded from the server 30. In the present embodiment, in a case where the job information is not transmitted from the server 30 in response to the current request in S26 and the history information stores information indicating "downloaded" or "download expired", it is determined that the target data has been downloaded and a negative determination is made in S48. On the other hand, in a case where the job information is transmitted from the server 30 and the history information does not store information indicating "downloaded" or "download expired", it is determined that the target data has not been downloaded, and an affirmative determination is made in S48.

When a negative determination is made in S48 and the process proceeds to S49, a text indicating the status information included in the history information is added to a region corresponding to the push scan display field 72 in the history screen data. Specifically, a text indicating "downloaded" or "download expired" is added. As in the present embodiment, the label name of the downloaded scan data may be added instead of the text indicating "downloaded" When the process of S49 ends, the process proceeds to S54.

On the other hand, in S48, when the job information is transmitted from the server 30 and the history information does not store information indicating "downloaded" or "download expired", an affirmative determination is made, and the process proceeds to S50. In S50, "not downloaded" is recorded as the status information included in the history information. Then, a text indicating "not downloaded" is added as the status information to the region corresponding to the push scan display field 72 in the history image data. The text indicating "not downloaded" is an example of information indicating that the target data can be downloaded. When the process of S50 ends, the process proceeds to S51.

In S51, it is determined whether a storage period has expired by using the "execution date and time" in the job information. For example, when the storage period of the scan data in the server 30 is determined as a storage period T1, it is determined whether a calculated period, which is a period from the current time to the "execution date and time", is equal to or longer than the storage period T1. In the present embodiment, when the calculated period is equal to or longer than the storage period T1 and the storage period is exceeded, the target data is deleted from the server 30, and therefore the target data cannot be downloaded from the server 30 anymore.

In S52, it is determined whether the target data can be downloaded. When it is determined in S51 that the calculated period exceeds the storage period, a negative determination is made in S52, the process proceeds to S53, and "download expired" is recorded as the status information included in the history information. Then, a text indicating that the scan data cannot be downloaded is added as the status information to the region corresponding to the push scan display field 72 in the history image data. In the present embodiment, as the status information, a text indicating "download expired" is added instead of the text "not downloaded" added to the history screen data in S48. The text indicating "download expired" is an example of information indicating that the target data cannot be downloaded. When the process of S53 ends, the process proceeds to S54. On the other hand, when an affirmative determination is made in S52, the process also proceeds to S54.

In S54, it is determined whether the process has been executed for all the target data. When a negative determination is made in S54, the process proceeds to S55, the target data is changed, and the process returns to S45. Then, the processes from S45 to S53 are executed on the new target data. In a case where the processes of S45 to S53 are repeated and the processes are executed on all the target data, an affirmative determination is made in S54, and the process proceeds to S56. In S56, the history screen 70 is displayed on the user IF 13 using the updated history screen data. Then, the process of S29 ends. A display order of the display fields 72 and 73 in S56 may be changed according to the job information. In this case, for example, a display order of the display fields 72 and 73 may be determined according to an order indicated by any information of "model name", "label name", "execution date and time", and "data size".

Figure 8:
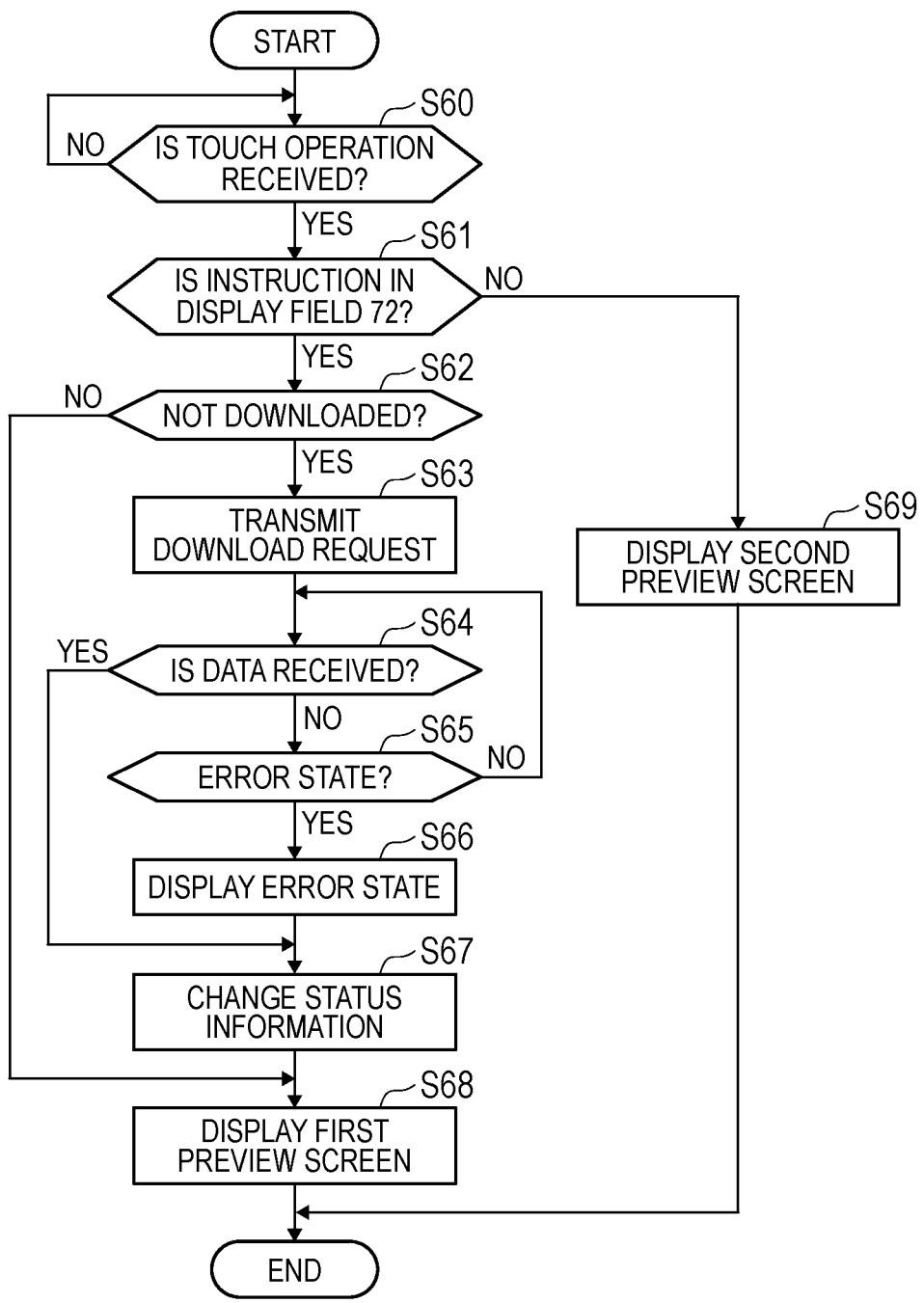
FIG. 8 is a flowchart illustrating a process executed when an operation on the history screen is received.

Next, a process executed by the program 21 when a touch operation is performed on the display fields 72 and 73 included in the history screen 70 will be described with reference to FIG. 8. The process illustrated in FIG. 8 is executed when the history screen 70 is displayed on the user IF 13 of the terminal device 10.

In S60, it is determined whether a touch operation on any one of the display fields 72 and 73 is received from the user IF 13. When a negative determination is made in S60, the process waits. When an affirmative determination is made in S60, the process proceeds to S61, and it is determined whether an instruction by the touch operation is in the push scan display field 72.

When an affirmative determination is made in S61, the process proceeds to S62, and it is determined whether the scan data designated by the touch operation is in the "not downloaded" state. Specifically, when the "not downloaded" is in the "status information" associated with the push scan display field 72, an affirmative determination is made in S62.

When an affirmative determination is made in S62, the process proceeds to S63, and a download request for the designated scan data is transmitted to the server 30. Specifically, a label name for identifying the scan data and a program ID for identifying the terminal device 10 are transmitted together with the download request. The label name is job information associated with the push scan display field 72 subjected to the touch operation. In the present embodiment, the process executed by the terminal CPU 12 in S63 is an example of the data acquisition process.

In S64, it is determined whether the designated scan data has been downloaded from the server 30. When a negative determination is made in S64, the process proceeds to S65, and it is determined whether the download is in an error state. The error state of the download includes a "connection error" caused by the fact that the communication connection with the server 30 is not possible, and a "download error" indicating that the scan data is already deleted on the server side. In addition, in a case where authentication of a token or the like is required for communication between the terminal device 10 and the server 30, the failure of the authentication may be set as the error state. When an affirmative determination is made in S65, the process proceeds to S66, and the error state is displayed in the push scan display field 72. On the other hand, when a negative determination is made in S65, the process returns to S64. When the designated scan data is received from the server 30, an affirmative determination is made in S64, and the process proceeds to S67.

When the server CPU 32 of the server 30 receives the download request from the terminal device 10, the server CPU 32 specifies the scan data to be downloaded from the job management table 40 using the label name and the program ID, and transmits the specified scan data and the job information to the terminal device 10. As a result, the scan data designated by the touch operation is downloaded to the terminal device 10.

In S67, when the scan data and the job information are received, the status information in the downloaded scan data is changed to "downloaded". Accordingly, in the subsequent processing, when the program 21 requests the acquisition of the job information in S26, "downloaded" is displayed as the status information on the history screen displayed in S29. When the process of S67 ends, the process proceeds to S68.

Figure 9:
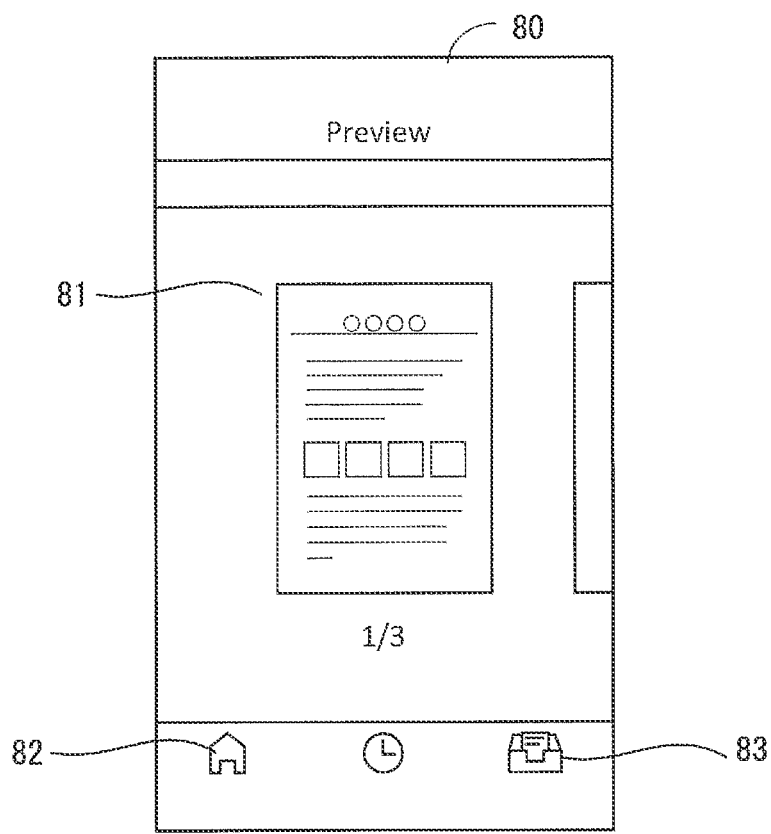
FIG. 9 is a diagram illustrating a preview screen.

In S68, a first preview screen is displayed on the user IF 13. The first preview screen is a preview screen in the scan data generated by the push scan process. As illustrated in FIG. 9, the first preview screen 80 includes a preview region 81 in which downloaded scan data is displayed. In the preview region 81, a scan image scanned in one push scan process (that is, one job is displayed. For example, when a plurality of documents are scanned in one push scan process, scan images corresponding to the plurality of documents are displayed in the preview region 81. In FIG. 9, three scan images can be displayed in the preview region 81. The user can switch the display of the scan images by scrolling the preview region 81.

When an operation icon 82 is operated on the first preview screen 80, the program 21 causes the user IF 13 to display the function selection screen 60. When an operation icon 83 is operated on the first preview screen 80, the program 21 causes the user IF 13 to display the history screen 70. A display format of the scan image on the first preview screen 80 is not limited to that illustrated in FIG. 9, and a plurality of scan images may be displayed in a list.

On the other hand, when a negative determination is made in S62, since the scan data. designated by the touch operation has already been downloaded to the terminal device 10, the process proceeds to S68, and the first preview screen 80 corresponding to the scan data designated by the touch operation is displayed. In this case, the first preview screen 80 illustrated in FIG. 9 is also displayed on the user IF 13. When the process of S68 ends, the process illustrated in FIG. 8 ends.

Returning to S61, in a case where the pull scan display field 73 is subjected to the touch operation, the process proceeds to S69. In S69, the second preview screen is displayed on the user IF 13. The second preview screen is a preview screen in the scan data generated by the pull scan process. Similar to or the same as the first preview screen 80, the second preview screen includes a preview region in which downloaded scan data is displayed. On the other hand, unlike the first preview screen, the second preview screen includes a scan instruction icon for receiving an additional scan for the document. When an instruction operation on the scan instruction icon is received via the user IF 13, the program 21 causes the user IF 13 to display an execution instruction screen 90 illustrated in FIG. 10.

Figure 10:
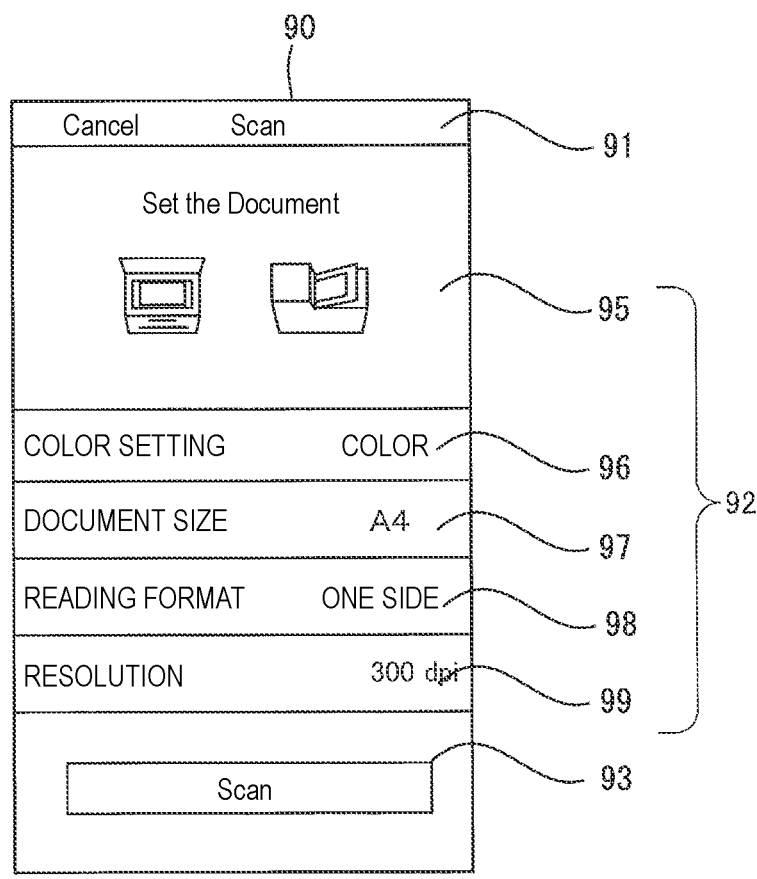
FIG. 10 is a diagram illustrating a scan setting screen.

As illustrated in FIG. 10, the execution instruction screen 90 is a screen for receiving an execution instruction for the additional scan. The execution instruction screen 90 includes a cancel operation reception region 91, a scan setting region 92, and an execution operation reception region 93. The cancel operation reception region 91 is a region that receives cancellation of execution of an additional scan. The execution operation reception region 93 is a region that receives execution of an additional scan. The scan setting region 92 is a region that receives an operation of changing the scan setting in the additional scan. In FIG. 10, the scan setting region 92 includes a region 95 indicating a setting direction of a document with respect to the MFP 50, a region 96 that receives an operation of changing "color setting", a region 97 that receives an operation of changing "document size", a region 98 that receives an operation of changing "reading format", and a region 99 that receives an operation of changing "resolution". Each scan setting can be changed within a range stored in the capability information. The scan setting region 92 may include a region that receives a change in each setting value of the "file format" and the "ADF inclination correction". When the process of S69 ends, the process of FIG. 8 ends.

In the present embodiment described above, the following effects can be achieved.

The terminal CPU 12 of the terminal device 10 acquires, from the server via the communication IF 16, the job information related to the push scan process in which the address of the scan data is the terminal device 10, and causes the user IF 13 to display the execution state of the push scan process based on the acquired job information. As a result, the user can know the execution state of the push scan process by viewing the terminal device 10, so that the convenience for the user can be improved.

The server 30 stores the scan data in association with the program ID, and the terminal CPU 12 transmits an acquisition request for the job information corresponding to the program ID to the server 30 via the communication If 16, and acquires, from the server 30, the job information of the scan data of which the address is the terminal device 10. The address corresponding to the terminal device 10 is specified as a destination of the scan data. Accordingly, even in a configuration in which a plurality of terminal devices can access the server 30, it is possible to acquire the job information of the scan data of which the address is the terminal device 10.

The terminal CPU 12 acquires job information when an instruction operation for displaying the history screen 70 is received from the user IF 13. Accordingly, since the job information is acquired from the server 30 each time the history screen 70 is displayed on the terminal device 10, the execution state of the push scan process can be displayed on the terminal device 10 in real time in accordance with the timing at which the user browses the history screen 70.

When the job information cannot be acquired, the terminal CPU 12 determines that the scan data has already been downloaded, and causes the user IF 13 to display the presence or absence of the download of the scan data as an execution state according to the determination result. As a result, the user can know whether the scan data has been downloaded by the display of the terminal device 10.

When the terminal CPU 12 receives an instruction operation for downloading scan data for which the scan data being not downloaded (i.e., "not downloaded") is displayed on the history screen 70, the terminal CPU 12 transmits a download request for the scan data for which the instruction operation has been received to the server 30. Thus, the download of the scan data can be started by the operation on the history screen 70.

The terminal CPU 12 determines whether the scan data can be downloaded based on the execution date and time of the push scan process and the storage period of the scan data, and displays the determination result as an execution state on the user IF 13. As a result, the user can know whether the scan data can be downloaded on the history screen 70.

The terminal CPU 12 does not display the execution state for the scan data in which a period from the current time to the execution date and time is equal to or longer than a predetermined period among the scan data already displayed on the history screen 70. As a result, the convenience for the user can be improved.

The terminal CPU 12 causes the user IF 13 to display the execution state of the pull scan process based on the job information related to the pull scan process in addition to the execution state of the push scan process. As a result, the execution state can be displayed also for the scan data generated by the pull scan process executed between the terminal device 10 and the MFP 50.

Modification of First Embodiment

In the first embodiment, the push scan display field 72 and the pull scan display field 73 are displayed on the history screen 70. Alternatively, only the push scan display field 72 may be displayed on the history screen 70.

In the first embodiment, the terminal CPU 12 uses the program ID in S26 of FIG. 4 to request the job information of the scan data addressed to the terminal device 10. Alternatively, the terminal CPU 12 may use identification information other than the program ID, such as a serial number of the device in S26 to request the job information of the scan data addressed to the terminal device 10. In this case, identification information other than the program ID may be registered in the address information 41.

In S29, the terminal CPU 12 may display "downloading" as the status information in addition to "not downloaded", "downloaded", and "download expired". In this case, when the push scan display field 72 is operated and download is started, the status information of "downloading" may be displayed in the push scan display field 72.

When the terminal CPU 12 determines whether the display fields 72 and 73 are deleted in S45 of FIG. 7, the terminal CPU 12 may determine whether the display fields 72 and 73 are deleted in accordance with the data size of the scan data in addition to whether the display period has elapsed. In this case, for example, when the execution date and time exceeds the display period and the data size is equal to or larger than a size determination value, the display fields 72 and 73 may be deleted. Instead of determining whether a predetermined display period has elapsed, the display fields 72 and 73 may be deleted when the number of display fields is equal to or greater than a predetermined number.

Second Embodiment

In a second embodiment, a configuration different from that of the first embodiment will be mainly described. In the second embodiment, the same elements as those in the first embodiment are denoted by the same reference numerals, and the description thereof will not be repeated.

In the second embodiment, when the server 30 uploads the scan data by the push scan process, the server 30 notifies the terminal device 10 of a push notification. As an example of a mechanism for providing the push notification service, Apple Push Notification Service (APNS) or Google Cloud Messaging for Android (GCM) can be used. In the present embodiment, when the service of the APNS or the GCM is used, it is assumed that the server 30 has already registered an address or the like indicating the location of the terminal device 10 that uses the service. The push notification is a notification according to the protocol of the APNS or the GCM.

Next, a process executed among the terminal device 10, the server 30, and the MFP 50 when executing the push scan process according to the present embodiment will be described with reference to FIG. 11. In S25, the server CPU 32 uploads the scan data by storing the scan data transmitted from the MFP 50 in the memory 35. The uploaded scan data is stored in the memory 35 in association with the label name of the job management table 40.

In S70, the server CPU 32 transmits a push notification using the service of the APNS or the GCM to the terminal device 10. In the present embodiment, the push notification transmitted in S70 includes job information related to the scan data of which an address is the terminal device 10. For example, when the push notification is received, the program 21 stores the job information included in the push notification in the memory 17 in S71.

When the push notification transmitted from the server 30 in S70 is received, the program 21 may transmit an acquisition request for the job information to the server 30. In this case, the program ID may be transmitted together with the acquisition request for the job information.

Thereafter, when an instruction operation to the history display icon 66 is received on the function selection screen 60 via the user IF 13, a display process of the history screen 70 is executed in S72 using the job information stored in S71. In the present embodiment, the display process of the history screen 70 executed in S72 is the same as the process executed in S29 in the first embodiment.

In the present embodiment described above, the following effects can be achieved. When the scan data is uploaded by the push scan process, the server 30 transmits the push notification to the terminal device 10. The terminal CPU 12 acquires the job information from the server 30 in response to the reception of the push notification. As a result, the job information can be acquired in real time at a timing when the scan data is uploaded.

The terminal CPU 12 acquires the job information included in the push notification received from the server 30, and displays the history screen 70 using the acquired job information. Thus, each time the scan data is uploaded to the server 30, the number of communications performed between the terminal device and the server 30 can be reduced, and thus an increase in the processing load of the terminal device can be reduced.

Modification of Second Embodiment

Figure 11:
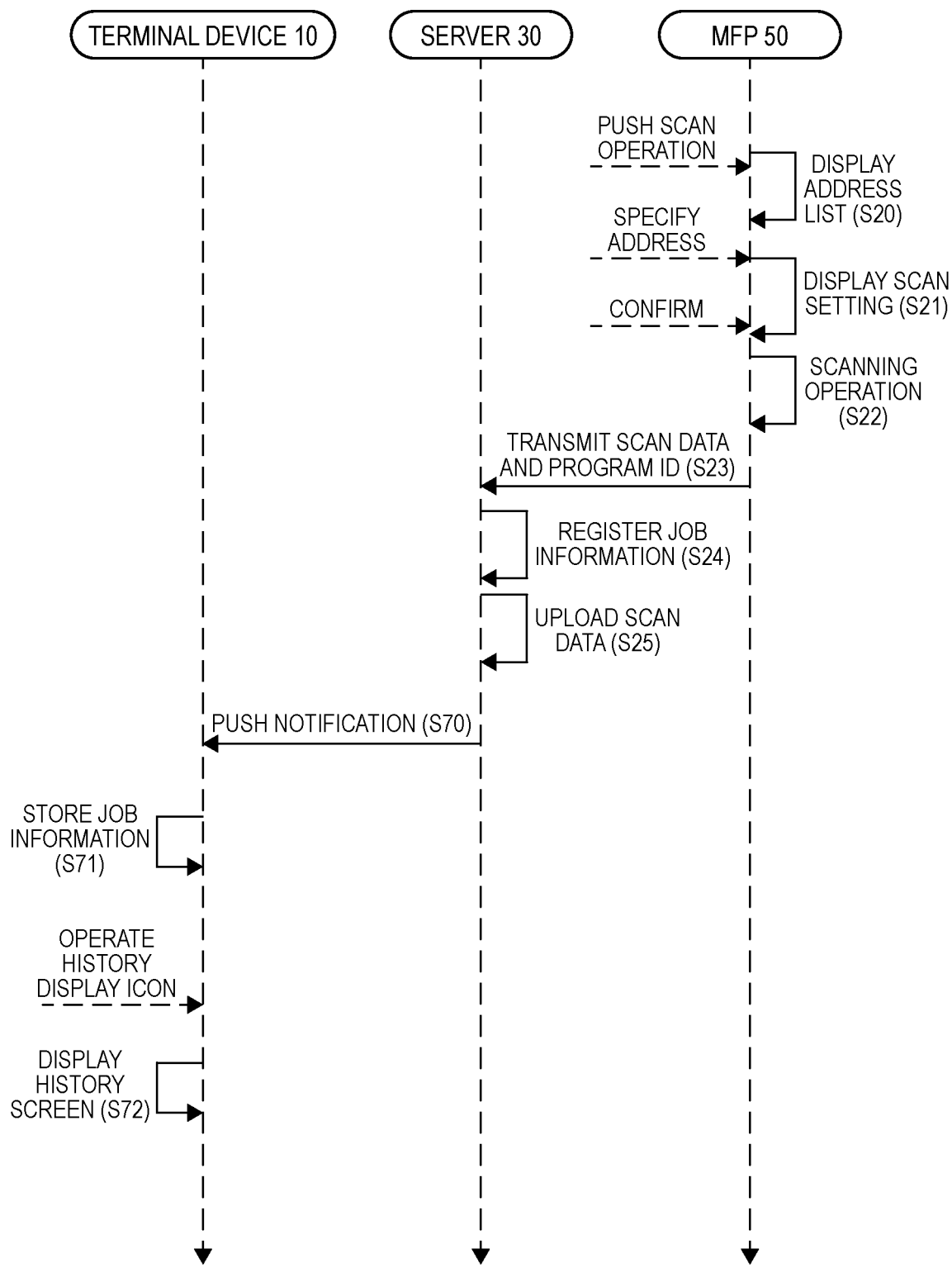
FIG. 11 is a timing chart illustrating a display procedure of a history screen.

In the second embodiment described above, the push notification is transmitted to the terminal device 10 by the server 30 in S70 of FIG. 11. Alternatively, the MFP 50 may transmit the push notification to the terminal device 10. In this case, the controller 57 of the MFP 50 may transmit the push notification including the job information to the terminal device 10 after transmitting the scan data to the server 30 in S23 of FIG. 11. Further, the process of S70 may be deleted.

Other Embodiments

The technique disclosed in the present specification is not limited to the embodiments described above. and can be modified into various forms without departing from the spirit thereof, and for example, the following modifications are also possible.

The MFP 50 is described as a scanner as an example, and the scanner may be a device having only a scanning operation.

In each of the above-described embodiments, the execution state of the push scan process is displayed on the history screen. Alternatively, the execution state of the push scan process may be displayed on a screen other than the history screen.

What is claimed is:

1. A non-transitory computer-readable recording medium storing a program including computer-readable instructions for a terminal device, the terminal device including a communication interface and a user interface,
the computer-readable instructions, when executed by a controller of the terminal device, causing the terminal device to:
acquire scan data generated by a push scan process of a scanner from a server via the communication interface, the push scan process being a process of causing the scanner to generate the scan data and uploading the generated scan data to the server;
acquire, via the communication interface, job information related to the push scan process; and
display an execution state of the push scan process on the user interface based on the job information: and,
wherein, when displaying the execution state of the push scan process, the computer-readable instructions, when executed by the controller, cause the terminal device to display a history screen of the push scan process on the user interface as the execution state based on the job information;
the history screen includes indication of (a) a first execution state based on a first job information and (b) a second execution state based on a second job information, and
in processing associated with the indication of the first execution state:
the history screen includes indication of information indicating status of download expired in an operational state where the first job information includes information showing that a predetermined storage period has elapsed since the scan data has been uploaded onto the server, and
the history screen does not include indication of information indicating status of download expired in an operational state where the first job information does not include information showing that a predetermined storage period has elapsed, since the scan data has been uploaded onto the server.

2. The non-transitory computer-readable recording medium according to claim 1,
wherein the server is configured to store the scan data in association with the program or in association with identification information for identifying the terminal device, and
wherein, when acquiring the job information, the computer-readable instructions, when executed by the controller, cause the terminal device to transmit an acquisition request for acquiring the job information including the identification information to the server via the communication interface, and to acquire the job information from the server, the identification information corresponding to the terminal device being specified as a destination of the job information.

3. The non-transitory computer-readable recording medium according to claim 1,
wherein the computer-readable instructions, when executed by the controller, cause the terminal device to acquire the job information when an instruction operation for displaying the history screen is received from the user interface.

4. The non-transitory computer-readable recording medium according to claim 1,
wherein the server or the scanner transmits a push notification to the terminal device when the scan data is uploaded by the push scan process, and
wherein the computer-readable instructions, when executed by the controller, cause the terminal device to acquire the job information from the server when the terminal device receives the push notification.

5. The non-transitory computer-readable recording medium according to claim 1,
wherein the server or the scanner transmits a push notification including the job information to the terminal device when the scan data is uploaded by the push scan process, and
wherein the computer-readable instructions, when executed by the controller, cause the terminal device to acquire the job information included in the received push notification.

6. The non-transitory computer-readable recording medium according to claim 1,
wherein, when displaying the execution state of the push scan process, the computer-readable instructions, when executed by the controller, cause the terminal device to determine the scan data being already downloaded under at least one condition that the terminal device is not able to acquire the job information, and to display whether the scan data is downloaded on the user interface as the execution state according to a determination result.

7. The non-transitory computer-readable recording medium according to claim 6,
wherein, when receiving an instruction operation for downloading scan data for which the scan data being not downloaded is displayed as the execution state, the computer-readable instructions, when executed by the controller, cause the terminal device to transmit a download request for downloading the scan data for which the instruction operation is received to the server.

8. The non-transitory computer-readable recording medium according to claim 6,
wherein, when an instruction operation is performed on scan data for which the scan data being downloaded is displayed as the execution state, the computer-readable instructions, when executed by the controller, cause the terminal device to display, on the user interface, a preview screen of the scan data for which the instruction operation is received.

9. The non-transitory computer-readable recording medium according to claim 1,
wherein a storage period of the uploaded scan data is determined,
wherein the job information includes an execution date and time of the push scan process, and
wherein, when displaying the execution state of the push scan process, the computer-readable instructions, when executed by the controller, cause the terminal device to determine whether download of the scan data is possible based on the execution date and time of the push scan process and the storage period of the scan data, and to display a determination result on the user interface as the execution state.

10. The non-transitory computer-readable recording medium according to claim 1,
wherein the job information includes an execution date and time of the push scan process, and
wherein the computer-readable instructions, when executed by the controller, cause the terminal device not to display the execution state for scan data for which a period from a current time to the execution date and time is equal to or longer than a predetermined period, among the scan data for which the execution state is already displayed.

11. The non-transitory computer-readable recording medium according to claim 1,
wherein the terminal device is configured to transmit an execution request to the scanner via the communication interface to cause the scanner to execute a pull scan process, and is capable of storing the scan data generated by the pull scan process, and
wherein, when displaying the execution state of the push scan process, the computer-readable instructions, when executed by the controller, cause the terminal device to display the execution state of the pull scan process on the user interface based on job information related to the pull scan process in addition to the execution state of the push scan process.

12. The non-transitory computer-readable recording medium according to claim 1, wherein in processing associated with the indication of the second execution state:
the history screen includes indication of information indicating status of not downloaded in an operational state where the second job information includes information showing that the scan data uploaded onto the server has not been downloaded, and
the history screen does not include indication of information indicating status of not downloaded in an operational state where the second job information does not include information showing that the scan data uploaded onto the server has not been downloaded.

13. The non-transitory computer-readable recording medium according to claim 1, wherein:
in an operational state where a predetermined display period has been elapsed for the first execution state, the indication of the first execution state is deleted, and in an operational state where a predetermined display period has not been elapsed for the second execution state, the indication of the second execution state is not deleted.

14. The non-transitory computer-readable recording medium according to claim 1, wherein in processing associated with the indication of the second execution state,
the history screen includes indication of information indicating status of Server Connection Error in an operational state where the second job information includes information showing that communication between the terminal device and the server is unavailable, and
the history screen does not include indication of information indicating status of Server Connection Error in an operational state where the second job information does not include information showing that communication between the terminal device and the server is unavailable.

15. The non-transitory computer-readable recording medium according to claim 1, wherein in an operational state where an execution state of a pull scan process is stored in a memory of the terminal device,
the history screen includes indication of a third execution state that shows execution state of the pull scan process, and
the pull scan process including a process in which the server transmits an instruction to execute a scanning operation, to the scanner, causing the scanner to generate scan data and uploading the generated scan data to the server.

16. A terminal device comprising:
a communication interface;
a user interface; and
a controller configured to execute:
acquiring scan data generated by a push scan process of a scanner from a server via the communication interface, the push scan process being a process of causing the scanner to generate the scan data and uploading the generated scan data to the server;
acquiring, via the communication interface, job information related to the push scan process; and
displaying an execution state of the push scan process on the user interface based on the acquired job information: and,
wherein, when displaying the execution state of the push scan process, the controller causes the terminal device to display a history screen of the push scan process on the user interface as the execution state based on the job information;
the history screen includes indication of (a) a first execution state based on a first job information and (b) a second execution state based on a second job information, and
in processing associated with the indication of the first execution state:
the history screen includes indication of information indicating status of download expired in an operational state where the first job information includes information showing that a predetermined storage period has elapsed since the scan data has been uploaded onto the server, and
the history screen does not include indication of information indicating status of download expired in an operational state where the first job information does not include information showing that a predetermined storage period has elapsed, since the scan data has been uploaded onto the server.

17. A display control method executed by a terminal device including a communication interface and a user interface, the display control method comprising:
acquiring scan data generated by a push scan process of a scanner from a server via the communication interface, the push scan process being a process of causing the scanner to generate the scan data and uploading the generated scan data to the server;
acquiring, via the communication interface, job information related to the push scan process; and
displaying an execution state of the push scan process on the user interface based on the job information: and,
wherein, when displaying the execution state of the push scan process, causing the terminal device to display a history screen of the push scan process on the user interface as the execution state based on the job information;
the history screen includes indication of (a) a first execution state based on a first job information and (b) a second execution state based on a second job information, and
in processing associated with the indication of the first execution state:
the history screen includes indication of information indicating status of download expired in an operational state where the first job information includes information showing that a predetermined storage period has elapsed since the scan data has been uploaded onto the server, and
the history screen does not include indication of information indicating status of download expired in an operational state where the first job information does not include information showing that a predetermined storage period has elapsed, since the scan data has been uploaded onto the server.

18. The display control method according to claim 17, wherein the server is configured to store the scan data in association with the program or in association with identification information for identifying the terminal device, and
wherein the acquiring of the job information comprises transmitting an acquisition request for acquiring the job information including the identification information to the server via the communication interface, and acquiring the job information from the server, the identification informationaddress corresponding to the terminal device being specified as a destination of the job information.

19. The display control method according to claim 17, wherein the acquiring of the job information is executed when an instruction operation for displaying the history screen is received from the user interface.

20. The display control method according to claim 17, wherein the server or the scanner transmits a push notification to the terminal device when the scan data is uploaded by the push scan process, and
wherein the acquiring of the job information comprises acquiring the job information from the server when the terminal device receives the push notification.

21. The display control method according to claim 17, wherein the server or the scanner transmits a push notification including the job information to the terminal device when the scan data is uploaded by the push scan process, and wherein the acquiring of the job information comprises acquiring the job information included in the received push notification.

22. The display control method according to claim 17, wherein the displaying of the execution state comprises determining the scan data being already downloaded under at least one condition that the terminal device is not able to acquire the job information, and displaying whether the scan data is downloaded on the user interface as the execution state according to a determination result.

\* \* \* \* \*